United States Patent
Nien et al.

(10) Patent No.: US 7,302,738 B2
(45) Date of Patent: Dec. 4, 2007

(54) SAFE DISENGAGING DEVICE FOR THE PULL CORD OF A BLIND

(75) Inventors: Ming Nien, Taichung (TW); Yu-Che Wen, Taichung (TW)

(73) Assignee: Nien Made Enterprise Co., Ltd., Taichung (TW)

( * ) Notice: Subject to any disclaimer, the term of this patent is extended or adjusted under 35 U.S.C. 154(b) by 16 days.

(21) Appl. No.: 11/346,339

(22) Filed: Feb. 3, 2006

(65) Prior Publication Data

US 2007/0180663 A1    Aug. 9, 2007

(51) Int. Cl.
*E06B 9/326* (2006.01)
*F16G 11/00* (2006.01)

(52) U.S. Cl. .............................. 24/115 F; 160/178.1 R; 160/178.2

(58) Field of Classification Search .................. 16/202, 16/208, 205, 900; 24/115 F; 160/178.1 R, 160/178.2
See application file for complete search history.

(56) References Cited

U.S. PATENT DOCUMENTS

| | | | | |
|---|---|---|---|---|
| 2,631,661 A | * | 3/1953 | Nelson | 160/133 |
| 3,246,685 A | * | 4/1966 | Anderson et al. | 160/133 |
| 6,431,248 B1 | * | 8/2002 | Hyman et al. | 160/178.1 R |
| 6,585,026 B2 | * | 7/2003 | Su et al. | 160/243 |
| 6,644,379 B1 | * | 11/2003 | Nei | 160/243 |
| 6,845,803 B1 | * | 1/2005 | Nien | 160/178.1 R |
| 7,017,230 B2 | * | 3/2006 | Lin | 16/202 |
| 2005/0087312 A1 | * | 4/2005 | Nien | 160/178.1 R |

* cited by examiner

*Primary Examiner*—Robert J. Sandy
(74) *Attorney, Agent, or Firm*—Ming Chow; Sinorica, LLC

(57) ABSTRACT

A safe disengaging device for the pull cord of a blind includes a male support base and a female support base. The male support base is fixed on the upper frame of a blind and provided with a protruding clasping block having its upper side formed with an engage shoulder. The female support base has its lower end tied with a pull cord and its upper end extending upward to form an elastic member corresponding to the clasping block of the male support base and having its upper free end formed with an engage hook to be engaged on the engage shoulder. When the pull cord is drawn by an excessively great force, the elastic member will be disengaged from the engage block, and the female support base together with the pull cord will fall off, avoiding accidents caused by improper operation of the pull cord and elevating safety in use.

2 Claims, 5 Drawing Sheets

SAFE DISENGAGING DEVICE FOR THE PULL CORD OF A BLIND

BACKGROUND OF THE INVENTION

1. Field of the Invention

This invention relates to a safe disengaging device for the pull cord of a blind, particularly to one enabling the pull cord of a blind to be disengaged from the blind when the pull cord is drawn by an excessively great force, able to avoid accidents caused by operating the pull cord improperly and elevate safety in use of the blind.

2. Description of the Prior Art

A conventional blind includes a blind and a pull cord unit. The blind employed for blocking sunlight and preventing exposure of private matters can be drawn by the pull cord unit.

However, the motion of drawing the pull cord to wind up the blind always arouses children's curiosity; therefore, during playing, children like to draw the pull cords to wind up the blind for fun, but in case of carelessness, the pull cord may be entwined on a child's neck and cause accidents.

SUMMARY OF THE INVENTION

The objective of the invention is to offer a safe disengaging device for the pull cord of a blind, which is composed of a male support base and a female support base. The male support base is secured on the upper frame of a blind and provided at a preset location with a clasping block protruding forward and having its upper side formed with an engage shoulder. The female support base has its lower end tied with a pull cord and its upper end extending upward to form an elastic member corresponding to the clasping block of the male support base and formed with an upper free end. The female support base is provided with a ⊏-shaped holding arm at the outer side of the elastic member. The ⊏-shaped holding arm has its opposite ends respectively formed with an clasping member extending vertically and protruding inward to be engaged on the opposite inner walls of the clasping block of the male support base, with a deforming space formed between the holding arm and the outer side of the elastic member for the elastic member to be deformed therein. The female support base has its engage hook engaged on the engage shoulder of the clasping block and its holding arm clasped on the inner wall of the clasping block, letting the female support base firmly fitted on the male support base. When the pull cord is drawn by an excessively great force, the elastic member will be elastically deformed outward to force the clasping hook to be disengaged from the engage shoulder, letting the female support base together with the pull cord fall off, thus avoiding accidents caused by improper operation of the pull cord and elevating safety in use.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
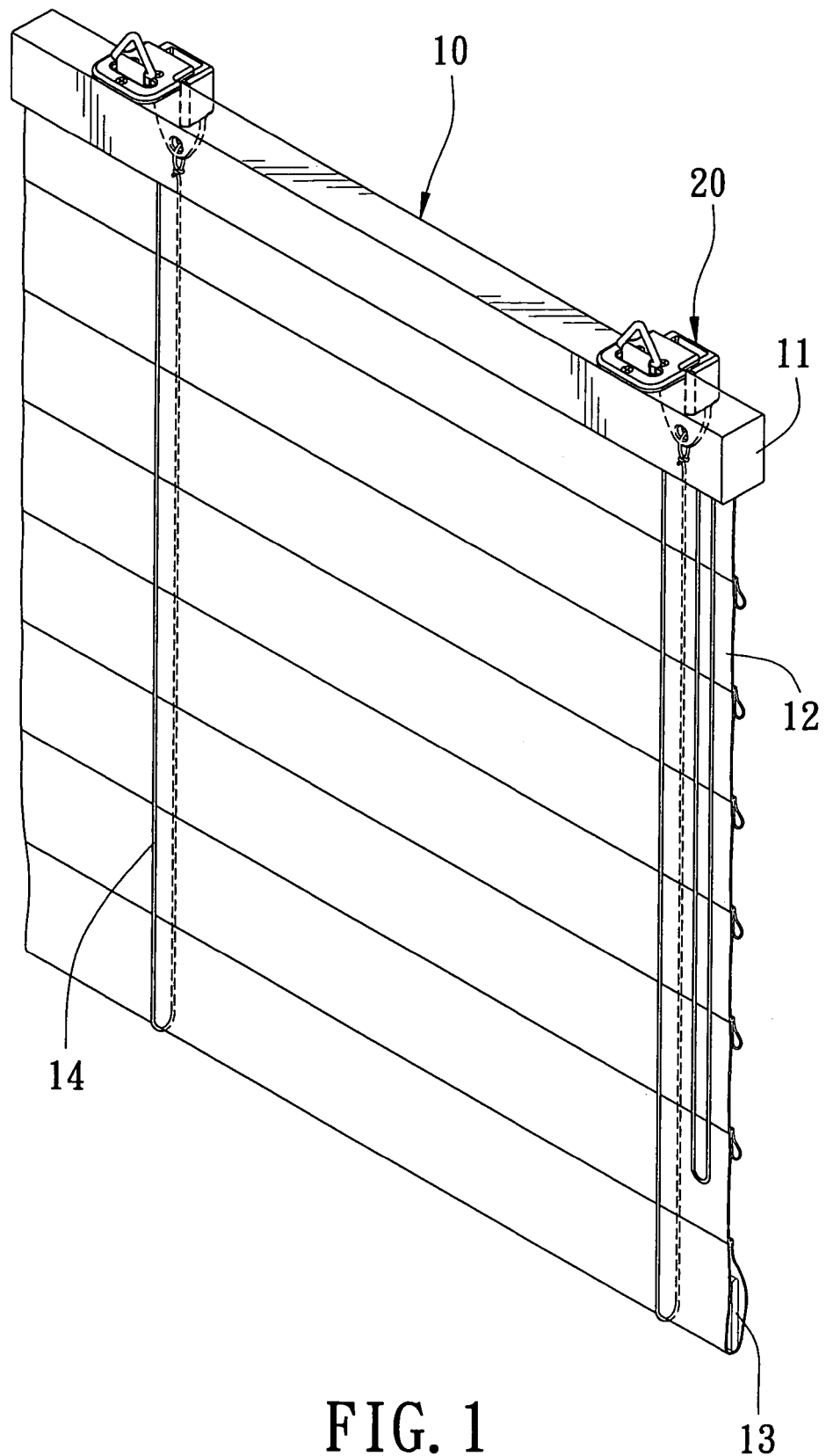
FIG. 1 is a perspective view of a pull-cord safe disengaging device assembled on a blind in the present invention.
Figure 2:
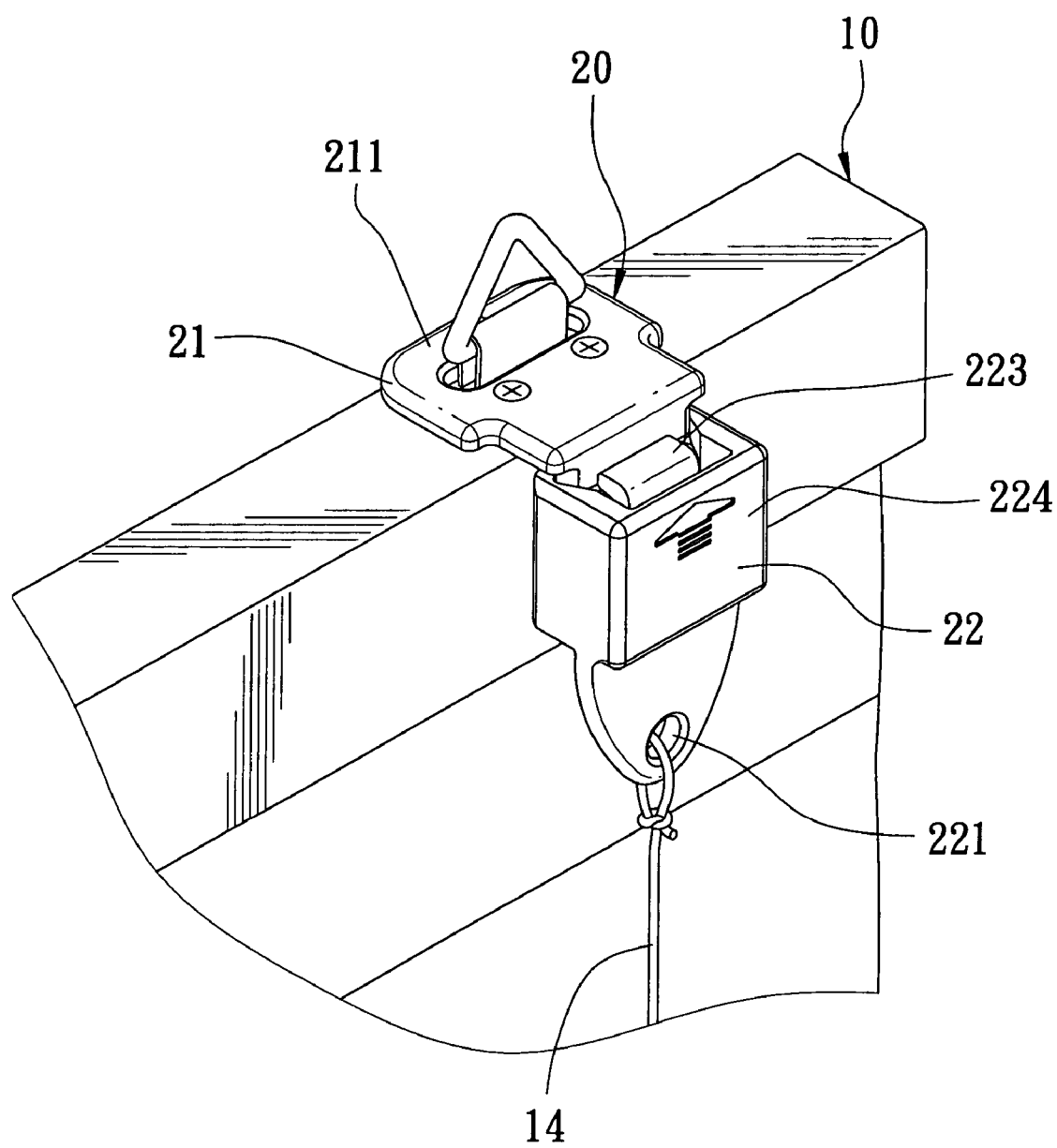
FIG. 2 is a partial perspective view of the pull-cord safe disengaging device assembled on a blind in the present invention.

A preferred embodiment of a safe disengaging device for the pull cord of a blind in the present invention, as shown in FIGS. 1-5, includes a blind 10 and two disengaging devices 20.

The blind 10 is composed of an upper frame 11, a screen 12, a lower frame 13 and two pull cords 14. The upper frame 11 is secured on the upper side of a window, and the screen 12 has its upper side connected with the lower side of the upper frame 11, able to completely cover the window, and the lower frame 13 is fixed with the lower side of the screen 12. The two pull cords 14 have their front ends respectively connected with the disengaging device 20 and, after inserted through the slats of the blind 10, the pull cords have the lower ends suspending freely at one side of the blind 10. Thus, the screen 12 can be controlled in position by drawing the lower ends of the pull cords, letting light pass through the screen in various extents Each disengaging device 20 consists of a male support base 21 and a female support base 22. The male support base 21 has its upper side extending outward to form a combining member 211 to be combined with the upper frame 11 and its lower side protruding forward to form a clasping block 212 having its upper side formed with an engage shoulder 213 slanting forward for a preset angle. The female support base 22 has its lower end bored with a cord-tying hole 221 tied with the front end of the pull cord 14. The female support base 22 is provided with an elastic member 222 corresponding to the clasping block 212 of the male support base 21 and having its upper end extending upward to form a free end, which is bent inward horizontally to form an engage hook 223 to be engaged on the engage shoulder 213 of the male support base 21. Further, the elastic member 222 of the female support base 22 has its outer side provided with a ⊏-shaped holding arm 224, with a deforming space 226 formed between the holding arm 224 and the outer side of the elastic member 222 for the elastic member 222 to be deformed therein. Furthermore, the ⊏-shaped holding arm 224 has its opposite ends respectively provided with a clasping member 225 extending vertically and protruding inward to be clasped on the opposite inner walls of the engage block 212 of the male support base 21.

Figure 3:
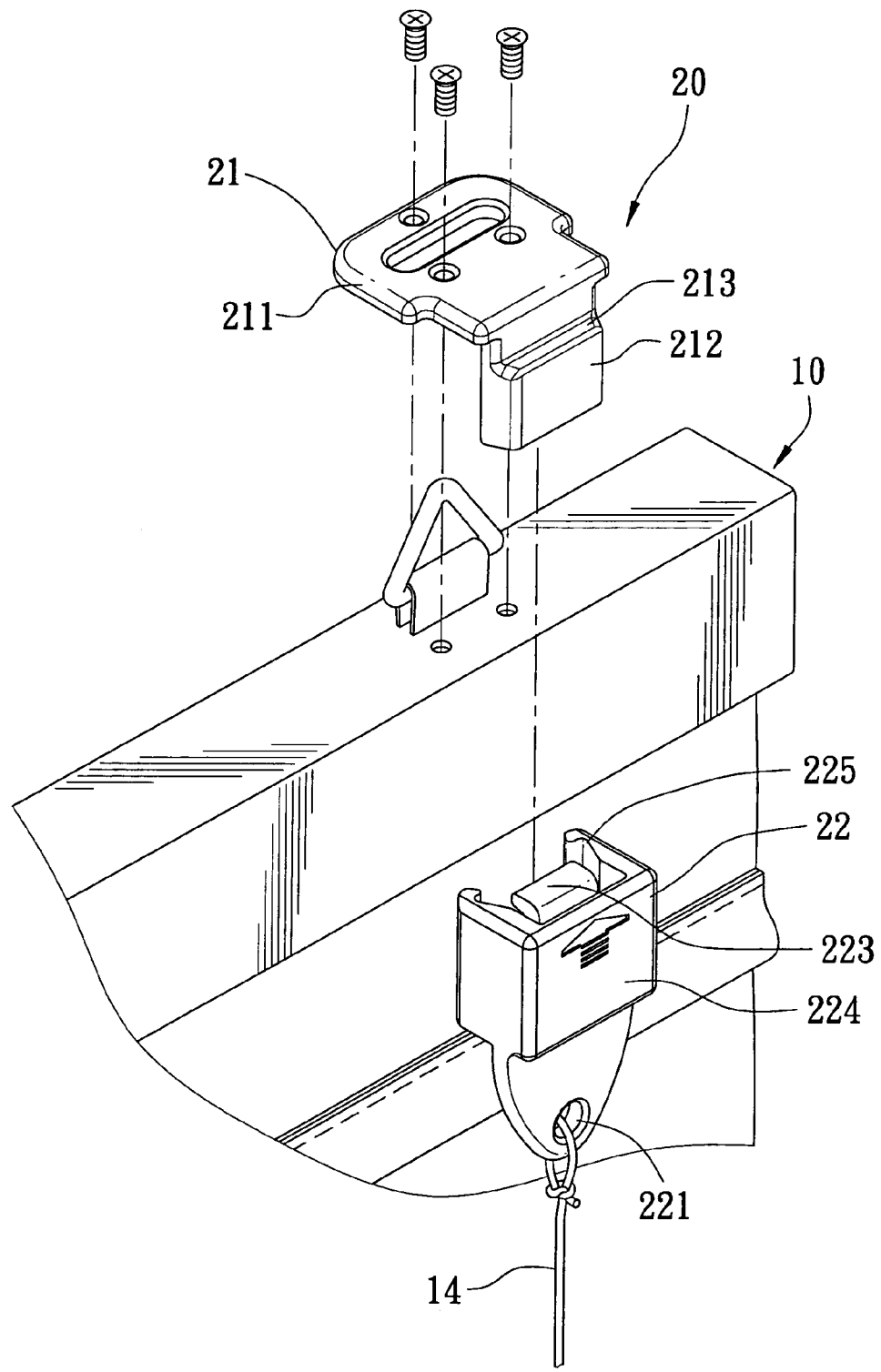
FIG. 3 is an exploded perspective view of the pull-cord safe disengaging device in the present invention.
Figure 4:
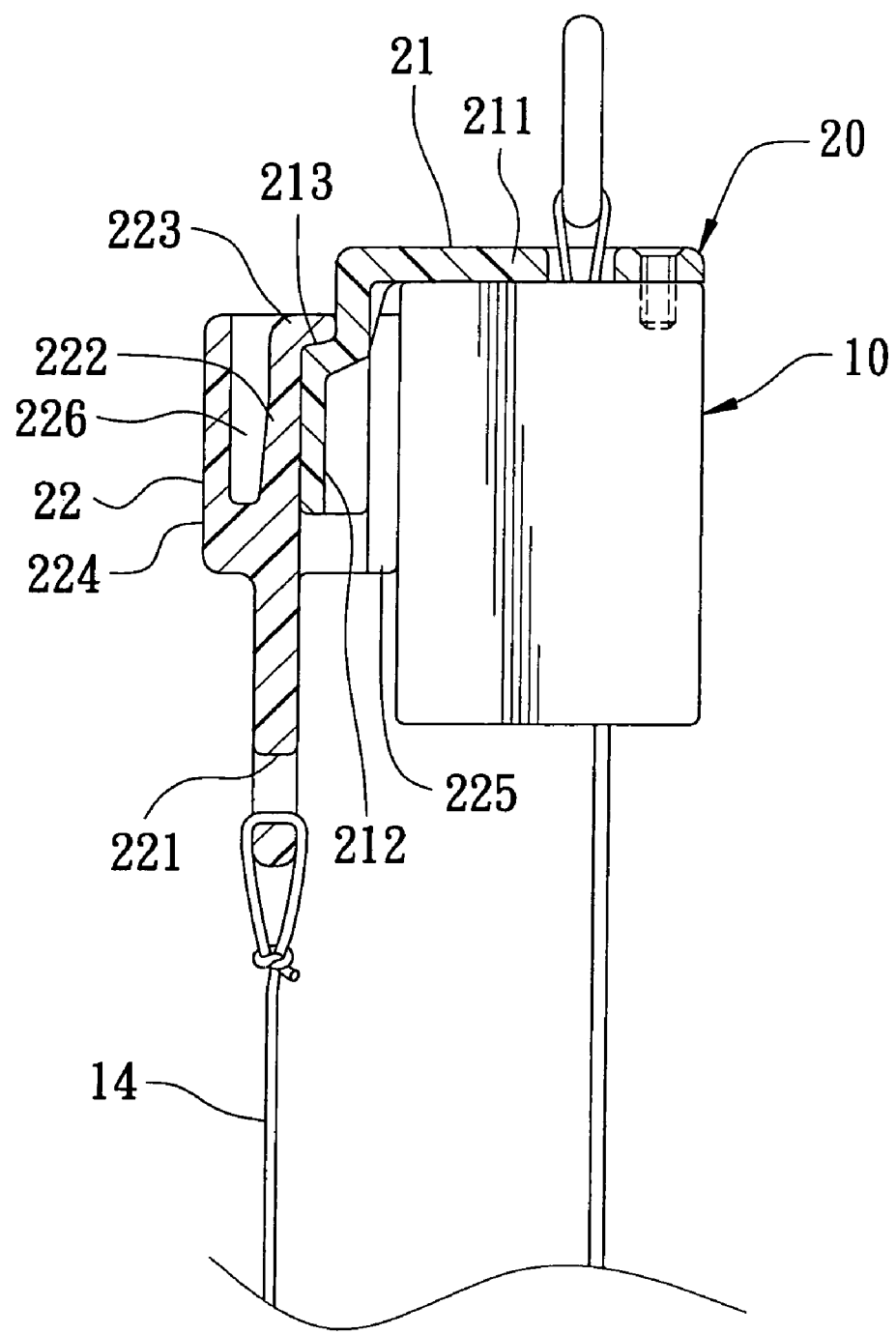
FIG. 4 is a side cross-sectional view of the pull-cord safe disengaging device in the present invention.
Figure 5:
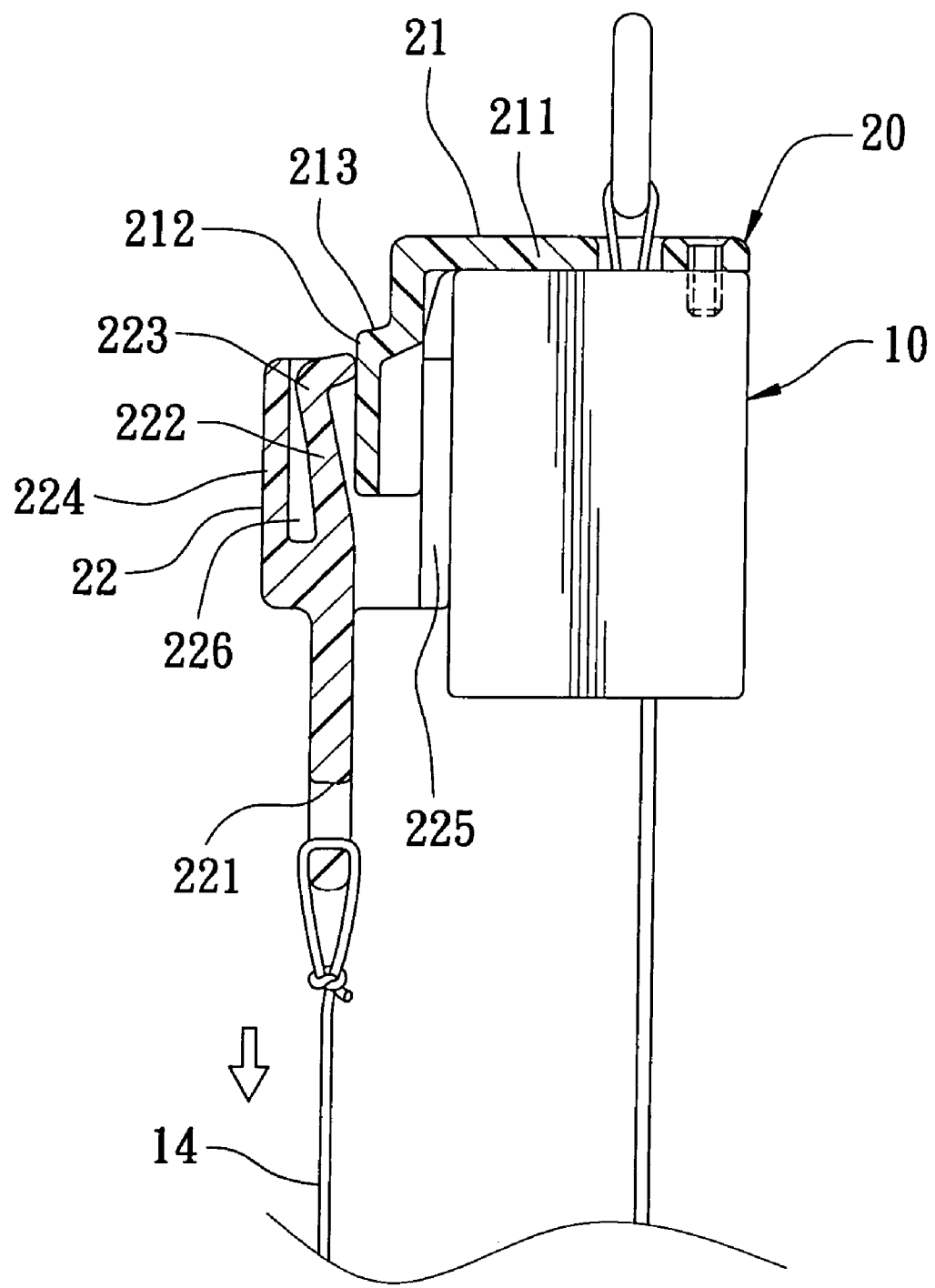
FIG. 5 is a side cross-sectional view of the pull-cord safe disengaging device drawn to disengage from the blind in the present invention.

In assembling, as shown in FIGS. 3, 4 and 5, when the female support base 22 is fitted on the male support base 21 from under the male support base 21, the engage hook 223 at the upper end of the elastic member 222 will be compressed backward by the engage block 212 of the male support base 21 and produce an elastic force of restitution to enable the female support base 22 to be fitted on the male support base 21. When the engage hook 223 is positioned on the engage shoulder 213 of the male support base 21, the recovering elastic force of the elastic member 222 will force the engage hook 223 to be held on the engage shoulder 213. When the female support base 22 is fitted on the male support base 21, the two clasping members 225 at the opposite ends of the holding arm 224 of the female support base 22 will be respectively clasped on the opposite inner walls of the engage block 212 of the male support base 21, letting the female support base 22 fixedly mounted on the male support base 21, able to prevent the female support base 22 from falling off in case the left or the right side of female support base 22 is drawn.

When the pull cord 14 is drawn, the engage hook 223 will receive a relative reaction force and the elastic member 222 will be elastically compressed outward, letting the engage hook 223 shifted outward along the engage shoulder 213 of the male support base 21. If the pull cord 14 is drawn by a force that is not excessively great, after the pull cord 14 is released, the elastic member 222 will recover its elastic force to force the engage hook 223 to elastically recover its original position. On the contrary, if the pull cord is drawn by an excessively huge force, the engage hook 223 will be actuated to disengage from the engage shoulder 213 of the male support base 21 and the female support base 22 together with the pull cord 14 will fall off from the male support base 21.

After the female support base 22 is disengaged from the male support base 21, if the blind 10 is to be used anew, only fit the female support base 22 on the male support base 21 again and the blind 10 can be drawn by the pull cord 14.

To sum up, this invention has the following advantages.

1. When the elastic member of the female support base is forced to move outward by an excessively great force, it will disengage from the engage block of the male support base, letting the pull cord lose efficacy to avoid accidents caused by improper operation of the pull cord.

2. The female support base is provided with a holding arm having its opposite ends respectively fixed with a clasping member; therefore, when the female support base is fitted on the male support base, the two clasping members of the holding arm will be respectively clasped on the opposite inner walls of the engage block of the male support base so as to firmly fix the female support base on the male support base, able to prevent the female support base from falling off when the left or the right side of the female support base is drawn by the pull cord.

3. The female support base can be fitted on the male support base conveniently and easily and can be used repeatedly without causing any damage.

While the preferred embodiment of the invention has been described above, it will be recognized and understood that various modifications may be made therein and the appended claims are intended to cover all such modifications that may fall within the spirit and scope of the invention.

We claim:

1. A safe disengaging device for a pull cord of a blind comprising:

a male support base fixed at a preset location on the upper frame of a blind, said male support base provided with a clasping block protruding forward at a preset location, said clasping block having its upper side formed with an engage shoulder;

a female support base having its lower end tied with a pull cord of said blind, said female support base having its upper side extending upward to form an elastic member with an upper free end, said free end of said elastic member bent inward horizontally to form an engage hook to be held on said engage shoulder of said male support base, said female support base further provided with an annular holding arm, said annular holding arm being C-shaped and positioned at the outer side of said elastic member, said C-shaped holding arm having its opposite ends respectively fixed with a clasping member extending vertically and protruding inward, with a deforming space formed between said holding arm and the outer side of said elastic member for said elastic member to be deformed therein; and said female support base filled on said male support base from under said male support base, said engage hook of said elastic member elastically held on said engage shoulder of said male support base, said holding arm of said female support base firmly holding opposite walls of said clasping block of said male support base, enabling said female support base to be firmly fitted on said male support base, said elastic member deformed outward to force said engage hook to be disengaged from said engage shoulder of said male support base when said pull cord at the lower end of said female support base is drawn by a preset force, letting said female support base disengage from said male support base.

2. The safe disengaging device for the pull cord of a blind as claimed in claim 1, wherein said engage shoulder of said male support base slants downward for a preset angle.

* * * * *